United States Patent Office 3,477,468
Patented Nov. 11, 1969

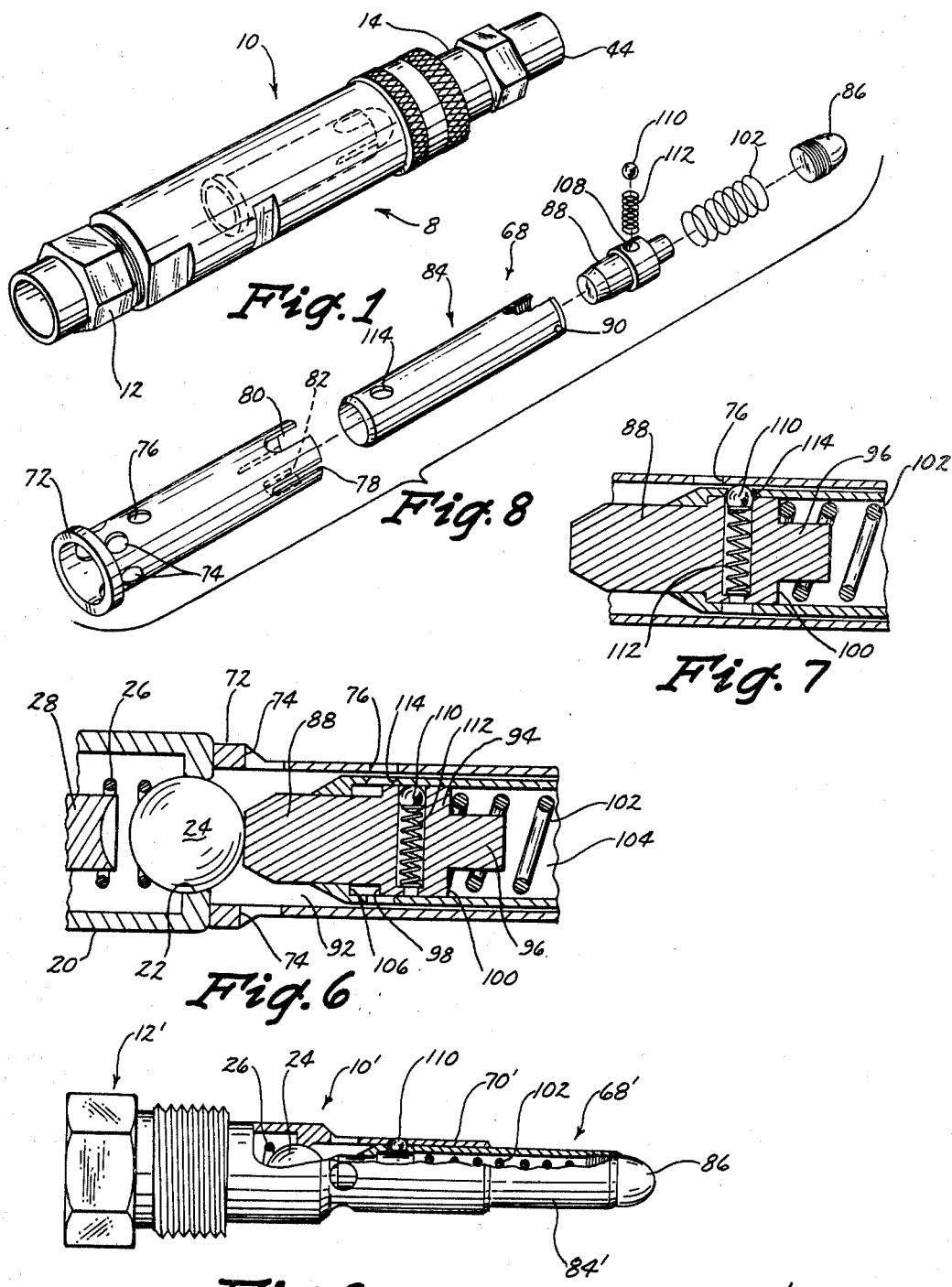

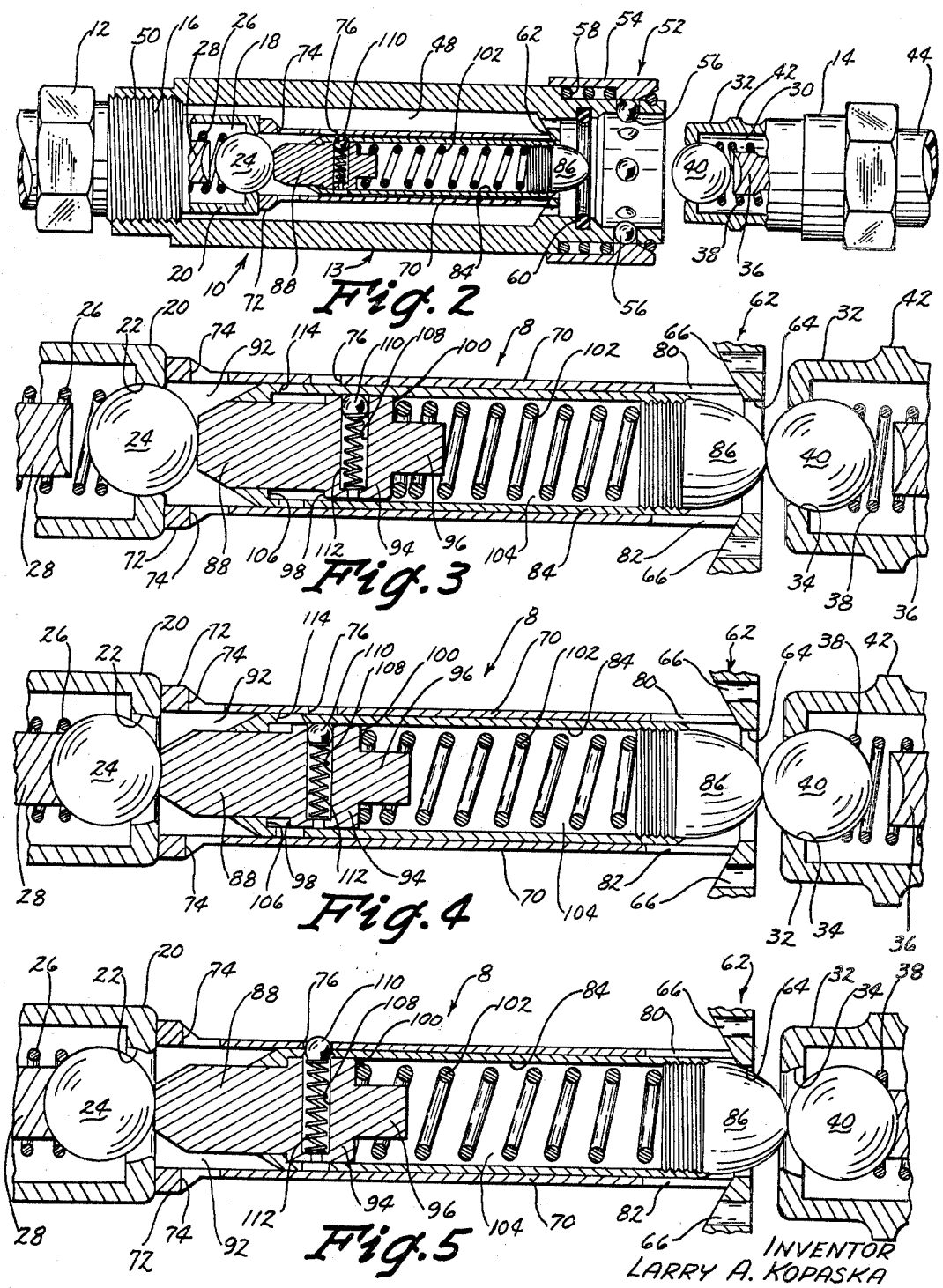

3,477,468
COUPLING DEVICE
Larry A. Kopaska, Guthrie Center, Iowa 50115
Filed Feb. 9, 1967, Ser. No. 614,867
Int. Cl. F17c 3/00; F16k 31/12
U.S. Cl. 137—614.05                8 Claims

ABSTRACT OF THE DISCLOSURE

A coupling device for detachably connecting a pair of conduits including first and second fittings adapted to be connected to the pair of conduits respecively and a means in one of the first and second fittings adapted to unseat the check valves in the first and second fittings at times and to prevent the undesirable seating of the check valves in the fittings during the operation of the equipment to which the conduits are connected.

---

Coupling devices are commonly used to effect the connection of a tractor hydraulic line to an implement hydraulic line. Existing coupling devices are extremely difficult to effect the connection thereof when one or both of the tractor or implement hydraulic lines are under pressure. To effect the connection of the large majority of existing coupling devices, when both the tractor and implement lines are under pressure, the line in the tractor valve must be closed to release the pressure on the tractor line. However, since most of the tractor valves automatically return to a neutral position to again impose pressure on the tractor line, it is necessary to hold the tractor valve in the closed condition. One then must assemble the tractor line coupling to the equipment line coupling with one hand and this is obviously extremely difficult. After this has been done, the hydraulic valve on the tractor line is then open to make the coupling operational.

Also, even after the ball valves in the tractor and implement fittings have been unseated to permit the connection thereof, a surge in the hydraulic pressure either in the tractor line or implement line will sometimes cause one of the ball valves to become "frozen" on its valve seat.

Therefore, it is a principal object of this invention to provide a coupling device which permits coupling when one or both of the tractor hydraulic line and equipment hydraulic line are under pressure.

A further object of this invention is to provide a coupling device which prevents the ball valves associated therewith from becoming "frozen" on its valve seat should a surge occur in the hydraulic pressure.

A further object of this invention is to provide a coupling device which permits the rapid coupling of the tractor hydraulic line and the equipment hydraulic line even if the ball valves associated therewith respectively are frozen.

A further object of this invention is to provide a coupling device which is durable in use.

A further object of this invention is to provide a coupling device which is economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the coupling device with the broken lines indicating the check valve actuator means therein;

FIG. 2 is a partial longitudinal sectional view of the coupling prior to the connection of the implement hydraulic line thereto;

FIG. 3 is a partial longitudinal sectional view of the coupling after the implement hydraulic line has been connected to the tractor hydraulic line;

FIG. 4 is a partial longitudinal sectional view of the coupling after the implement hydraulic line has been connected to the tractor hydraulic line and the tractor hydraulic pump pressure has been taken off of the coupling;

FIG. 5 is a partial longitudinal sectional view of the coupling after the implement hydraulic line has been connected to the tractor hydraulic line, the pump pressure has been taken off of the coupling and the pump pressure has been subsequently reapplied to the coupling;

FIG. 6 is a fragmentary longitudinal sectional view of the coupling illustrating the relationship of the internal components thereof when the implement hydraulic line has been connected to the tractor hydraulic line and the ball valve in the tractor hydraulic line is frozen while the ball valve in the implement hydraulic line is not frozen;

FIG. 7 is a fragmentary exploded view of FIG. 2;

FIG. 8 is an exploded perspective view of the check valve actuator means; and

FIG. 9 is a plan view of an embodiment of the coupling with portions thereof cut away to more fully illustrate the invention.

The coupling of this invention is generally designated by the reference numeral 8 and is seen in perspective view in FIG. 1. In FIG. 1, the tractor hydraulic line coupling member 10 is seen to include a fitting portion 12 and a hollow cylindrical body portion 13 threadably secured thereto. The implement hose fitting is generally designated by the reference numeral 14. Fitting 12 is of conventional design and is provided with an externally htreaded portion 16, a longitudinal bore 18 extending therethrough and a reduced diameter portion 20 which extends laterally of threaded portion 16. Fitting 12 has an annular valve seat 22 formed in reduced diameter portion 20 which is adapted to receive a ball valve 24 which is yieldably maintained in seating engagement therewith by means of spring 26. Ball valve 24 is limited in its movement away from valve seat 22 by a stop means which is threadably secured to the interior of fitting 12 and, as seen in FIGS. 2 and 3, spring 26 embraces stop means 28. Fitting 12 is threadably secured to the tractor hydraulic power unit and fitting 12 and body portion 13 would normally be left attached thereto at all times. Fitting 14 is conventional and includes a longitudinal bore 30 extending therethrough, a protruding reduced diameter portion 32 and an annular valve seat 34 formed at the end of reduced diameter portion 32. A stop means 36 is threadably secured in the interior of bore 30 and has a spring means 38 mounted thereon which is adapted to yieldably urge ball valve 40 into seating engagement with valve seat 34. Fitting 14 is also provided with an annular ridge 42 extending outwardly from reduced diameter portion 32 and has an internally threaded portion adapted to threadably receive a hydraulic line 44 which is connected to the hydraulic cylinder or the like on the implement.

Body portion 13 includes an elongated hollow cylinder which is generally designated by the reference numeral 46, a longitudinal bore 48 formed therein and an internally threaded portion 50 at one end thereof. Cylinder 46 is threadably secured to fitting 12 as illustrated in FIG. 2. The other end of cylinder 46 is provided with a conventional releasable connection means 52 which is adapted to receive reduced diameter portion 32 of fitting 14 at times. Fitting 14 is attached to connection means 52 by simply moving collar 54 to the left as viewed in FIG. 2 thereby allowing ridge 42 to move past the retaining balls so that reduced diameter portion 32 is fully inserted into the right end, as viewed in FIG. 2, of cylinder 46 and so that ridge 42 is to the left or inwardly of balls 56. Collar 54 is then released and the spring means 58 causes collar 54 to be moved to the right thereby causing the balls 56 to be cammed inwardly with respect thereto and outwardly of ridge 42 to rigidly effect the connection of fitting 14 and the connection means 52. A conventional O-ring 60 is provided in the interior of cylinder 46 as illustrated in FIG. 2. As best illustrated in FIG. 2, cylinder 46 is provided with a tapered shoulder portion 62 having a central bore 64 extending therethrough and a plurality of openings 66 formed therein extending around opening 64.

The check valve actuation assembly is generally indicated by the reference numeral 68 and is seen in an exploded perspective view in FIG. 8. Assembly 68 includes a hollow sleeve 70 having a flared portion 72 at one end, a plurality of openings 74 formed therein adjacent flared portion 72 and a detent opening 76 formed therein inwardly of flared portion 72. The other end of sleeve 70 has a slot 78 formed therein and is also provided with a pair of opposed notches 80 and 82. A hollow cylinder 84 is slidably mounted in sleeve 70 and has a plunger 86 threadably secured thereto and extending therefrom at one end thereof and a plunger 88 slidably mounted in its other end which normally protrudes from said other end. Cylinder 84 has a lug 90 secured thereto adjacent one end (FIG. 8) which is adapted to be received by slot 78 in sleeve 70 to prevent rotation of sleeve 70 and cylinder 84 with respect to each other.

Plunger 88 is provided with a reduced diameter portion 92 at its outer end, a main body portion 94 and a reduced diameter portion 96 at its inner end. As seen in FIG. 6, the juncture of reduced diameter portion 92 and body portion 94 defines a shoulder 98 therebetween while the juncture of body portion 94 and reduced diameter portion 96 defines a shoulder 100 therebetween.

A spring 102 embraces reduced diameter portion 96 at one of its ends and engages the inner end of plunger 86 at its other end to yieldably resist the movement of plunger 88 towards plunger 86. Spring 102 is designed so as to have a compression greater than the total of springs 26 and 38. As seen in FIG. 6, the opening in cylinder 84 through which plunger 88 protrudes is slightly smaller than bore 104 to provide a shoulder 106 against which shoulder 98 of plunger 88 normally abuts. Body portion 94 is provided with a bore 108 formed therein which receives a detent ball 110 and spring 112 which urges ball 110 outwardly with respect to plunger 88. Cylinder 84 has a tapered opening 114 formed therein which is adapted to receive ball 110 therein at times and when so received, ball 110 will protrude slightly from cylinder 84 (see FIG. 7). As seen in FIG. 5, ball 110 will also be partially received by opening 76 in sleeve 70 at times.

Assembly 68 is positioned within bore 48 so that one end of sleeve 70 engages shoulder 62 which causes the proper alignment thereof so that plunger 86 may extend through opening 64. Assembly 68 is also maintained in its proper position within bore 48 due to the fact that the flared portion 72 is engaged by the end of reduced diameter portion 20 of fitting 12 so that plunger 88 will engage ball 24.

An embodiment of the coupling is illustrated in FIG. 9 and is generally designated by the numeral 10'. Coupling 10' is substantially identical to coupling 10 except that the check valve activator assembly 68' is an integral part of the fitting 12' and sleeve 70' does not extend to the end of cylinder 84'. With those exceptions, coupling 10' is identical to and functions exactly like coupling 10.

In FIG. 2, the relationship between the components of the coupling device prior to the connection of the implement hydraulic hose and fittings is illustrated. In FIG. 2 it can be seen that ball 110 in plunger 88 is received by opening 114 in cylinder 84 and that the cylinder 84 has been moved with respect to sleeve 70 so that opening 114 is one-eighth of an inch to the right of opening 76 as viewed in FIG. 2. At this point, shoulder 98 on plunger 88 is in engagement with shoulder 106 on cylinder 84 and that the spring 102 is not compressed at this time. The resiliency of spring 26 in fitting 12 and the pressure therein will maintain the ball valve 24 in seating engagement with its valve seat 22 and thus cause the plunger 88 and cylinder 84 to be moved to the right as viewed in FIG. 2. The resiliency of spring 26 is greater than the force required to shear ball 110 from its engagement with opening 76.

FIG. 3 illustrates the relationship of the components of the actuator assembly 68 with respect to the ball valves 24 and 40 after the fitting 14 has been releasably connected to the body portion 13 and while the tractor hydraulic pump pressure is still exerted on the coupling unit. FIG. 3 illustrates the position of the ball valves 24 and 40 when they are in a closed or "frozen" condition. Thus, as fitting 14 is received by body portion 13, ball valve 40 engages the outer end of plunger 86 and causes cylinder 84 to be moved towards ball valve 24 thereby compressing spring 102 and also causing ball 110 to be sheared from its seating engagement with opening 114 in cylinder 84. Thus, in effecting the connection of fitting 14 to the body portion 13, it is not necessary to unseat ball valve 40, which may be under great pressure, but it is simply necessary to compress spring 102 thereby causing the components of the actuator assembly 68 to move to the position seen in FIG. 3. At this point, the ball valves 24 and 40 are in seating engagement with their respective valve seats and the opening 76 has been moved one-quarter of an inch to the left as viewed in FIG. 3, in other words, from a position one-eighth of an inch to the right of opening 76 (FIG. 2) to a position one-eighth of an inch to the left of opening 76 (FIG. 3).

The next step in the coupling sequence is to shut off the hydraulic pressure to the coupling unit through the use of the tractor valve and the relationship of the various components of the ball valves and actuator assembly 68 is illustrated in FIG. 4 at the time the pressure is so shut off. When the pressure is shut off, the resiliency of spring 102 causes plunger 88 to be moved to the left thereby unseating ball valve 24 inasmuch as the compression of spring 102 is greater than the compression of spring 26. In FIG. 4, plunger 88 has moved one-eighth of an inch to the left from its position of FIG. 3 and has caused ball valve 24 to engage stop means 28 thereby limiting the movement of ball valve 24 and plunger 88 to the left as viewed in FIG. 4. It can be seen in FIG. 4 that the position of cylinder 84 with respect to sleeve 70 has not changed from the position of FIG. 3.

The next step in the coupling procedure is to supply hydraulic pressure to the coupling unit and the relationship of the components of the coupling unit is illustrated in FIG. 5 subsequent to the pressure being furnished thereto. The hydraulic fluid will pass from the tractor pump through the fitting 12 and around the ball valve 24, into the interior of sleeve 70 and outwardly therefrom through opening 74, through openings 62 and against the protruding portion of ball valve 40 thereby causing the same to be unseated from valve seat 34. The unseating of ball valve 40 from its valve seat permits the cylinder 84 and plunger 86 to move to the right as viewed in FIG. 5 until ball 110 is received by opening 114 and by opening 76 in cylinder 84 and sleeve 70 respectively. The movement to the right of cylinder 84 and plunger 86 is accomplished by the spring 104 and cylinder 84 will move one-eighth of an inch to the right from its position of FIG. 4. Thus, when the components of the actuator assembly 68 are in the relationship as illustrated in FIG. 5, plungers 88 and 86 yieldably resist the seating of ball valves 24 and 40 onto their respective valve seats. If a surge in the hydraulic pressure should occur while the implement is being operated and the components are in a position of FIG. 5, the freezing of one of the ball valves is prevented inasmuch as the surge must overcome the force necessary to shear ball 110 from its engagement with opening 114 and also to overcome the compression of spring 102.

Thus is can be seen that the coupling of the tractor and implement hydraulic conduits is quickly and easily effected inasmuch as it is not necessary to free one or both of the frozen ball valves during the actual connection step. It is simply necessary to exert an inward force on fitting 14 to cause the compression of spring 102 and thereby not requiring the freeing of either of the ball valves may or may not be frozen on their respective valve seats. The freeing of frozen ball valves is accomplished by utilization of the hydraulic power unit on the tractor thereby permitting a much easier connection of the tractor and implement hydraulic conduits. It can also be seen that the check valve actuator assembly 68 functions to prevent freezing of either or both of the ball valves should a surge of hydraulic pressure occur in the hydraulic system due to the relationship of the components as illustrated in FIG. 5.

FIG. 6 illustrates the relationship of the components of the coupling unit after the fitting 14 has been connected to the body portion 13. In FIG. 6, only the tractor ball valve is frozen while the ball valve in the fitting 14 is not frozen which causes only the plunger 88 to be displaced. As seen in FIG. 6, when only one of the ball valves is frozen, the cylinder 84 has not been displaced whereas in FIG. 3 (when both of the ball valves were frozen) the cylinder 84 was displaced to the left and the plunger 88 was displaced to the right with respect to opening 76 in sleeve 70.

The embodiment illustrated in FIG. 9 functions exactly like the coupling unit seen in FIGS. 1–8, and for that reason, the operation thereof will not be described in detail. In FIG. 9, the check valve actuating assembly has been made an integral part of the fitting 12' rather than the check valve actuator assembly being a removable component within the body portion of the coupling unit.

Thus from the foregoing it can be seen that the device accomplishes at least all of its stated objectives.

I claim:
1. In a coupling device, comprising,
first and second check valve means, one of said check valve means adapted to be operatively connected to a conduit in communication with a source of fluid under pressure, the other of said check valve means adapted to be operatively connected to an apparatus to be powdered by said fluid,
housing means detachably connecting said check valve means together,
and actuator means in said housing means,
said actuator means including an elongated hollow sleeve having opposite ends, an elongated hollow cylinder slidably mounted in said sleeve and having a length shorter than said sleeve, a plunger slidably mounted in said cylinder and extending from one end thereof, means limiting the extension of said plunger from said one end of said cylinder, the outer end of said plunger engaging said one check valve, said cylinder operatively engaging said other check valve at its other end, a first spring means in said cylinder between said plunger and the other end of said cylinder yieldably resisting the inward slidable movement of said plunger with respect to said cylinder, said cylinder and said plunger being length adjustable between a maximum length and a minimum length, said maximum length being sufficient to permit said plunger and said other end of said cylinder to engage and hold both of said check valves open, said minimum length being sufficient to permit both said check valve means to be simultaneously closed,
a detent lock means adapted to releasably lock said plunger in its position of maximum extension with respect to said cylinder, and also adapted to releasably maintain said cylinder in a first position with respect to said sleeve when said plunger is in its position of maximum extension from said cylinder, to exert unseating forces on said check valve means which are greater than the seating forces exerted on said check valve means.

2. The device of claim 1 wherein said housing has a tapered shoulder portion formed therein, said sleeve engaging said tapered shoulder portion at one of its ends, said sleeve having a flared portion at its other end which limits the lateral movement of said sleeve with respect to said housing, said one check valve means having a portion thereof engaging said flared portion to prevent movement of said sleeve away from said tapered shoulder portion.

3. The device of claim 2 wherein said flared portion has a plurality of fluid openings formed therein.

4. The device of claim 1 wherein a guide means interconnects said sleeve and said cylinder to prevent rotational movement therebetween.

5. The device of claim 1 wherein said one check valve means and said actuator means are of integral construction.

6. The structure of claim 1 further characterized in that said check valve means each have resilient means yieldably urging said check valve means into a closed position, the compression of said first spring means in said cylinder being greater than the total compression of both of said resilient means of said check valve means.

7. The structure of claim 1 further characterized in that said sleeve has a detent opening formed therein, said cylinder having a detent opening formed therein adapted to register with said sleeve detent opening when said cylinder is in its said postion, said plunger having a bore formed therein which is transverse to the longitudinal axis of said cylinder, a detent ball positioned in said plunger bore, a spring means in said plunger bore urging said detent ball outwardly therefrom, said plunger bore adapted to register with said cylinder detent opening and to also register with said sleeve detent opening, said detent ball releasably engaging said cylinder detent opening when said plunger is in its said position of maximum extension, said detent ball releasably engaging said cylinder detent opening and said sleeve detent opening when said plunger is in its said position of maximum extension and when said cylinder is in its said first position.

8. The structure of claim 7 wherein the combined force exerted by said spring means in said plunger bore, the releasable engagement of said detent ball with said sleeve and cylinder detent openings and the first spring means in said cylinder is greater than the seating forces extended on said check valve means.

References Cited

UNITED STATES PATENTS 3,348,575   10/1967   Simak _____ 137—614.05

WILLIAM F. O'DEA, Primary Examiner
HOWARD M. COHN, Assistant Examiner

U.S. Cl. X.R.
251—297